United States Patent [19]

Plummer

[11] 4,054,977
[45] Oct. 25, 1977

[54] BLOCK TYPE CUTTING TOOL WITH POSITIVE CLAMP FOR INSERT BLADES

[75] Inventor: Harvey R. Plummer, Fond du Lac, Wis.

[73] Assignee: Giddings & Lewis, Inc., Fond du Lac, Wis.

[21] Appl. No.: 682,464

[22] Filed: May 3, 1976

[51] Int. Cl.$^2$ .............................................. B26D 1/00
[52] U.S. Cl. ................................. 407/108; 408/240
[58] Field of Search ............................ 29/96; 408/240

[56] References Cited

U.S. PATENT DOCUMENTS

| | | | |
|---|---|---|---|
| 3,303,553 | 2/1967 | Severson | 29/96 |
| 3,504,413 | 4/1970 | Siewert et al. | 29/96 |
| 3,754,309 | 8/1973 | Jones et al. | 29/96 |

*Primary Examiner*—Leonidas Vlachos
*Attorney, Agent, or Firm*—Leydig, Voit, Osann, Mayer & Holt, Ltd.

[57] ABSTRACT

A block type cutting tool with insert blades of the throw away type, the block having pockets for mounting the inserts and clamps movable into the pockets for locking the inserts in place. Each insert includes a groove formed centrally thereof and running generally parallel to one of the locating surfaces of the pocket for engaging a tip portion of the associated clamp. The groove is wider than the tip so that locking of the clamp first causes the tip to wedge the insert into the pocket, following which the tip engages the lip of the groove to firmly draw the wedged insert against a locating surface. This arrangement more positively holds the insert against displacement when the tool is withdrawn, provides a perceptible stop indicating the clamp is fully locked, and, in cases where radial insert adjustment is provided, helps to guide the insert to prevent cocking.

8 Claims, 4 Drawing Figures

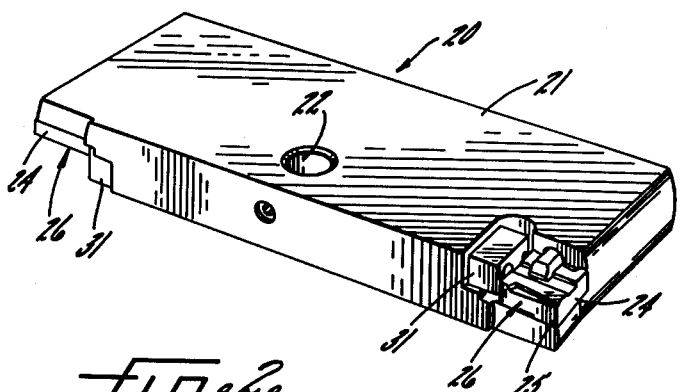
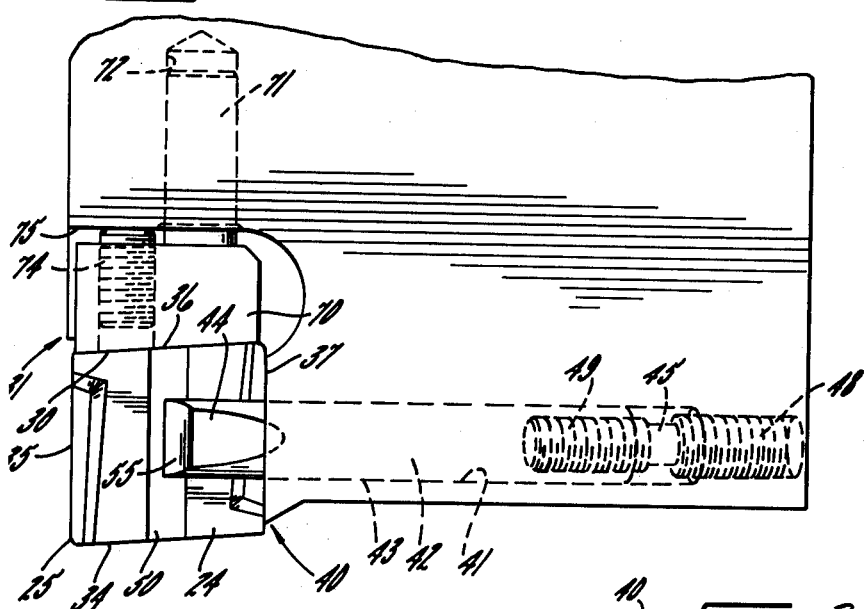
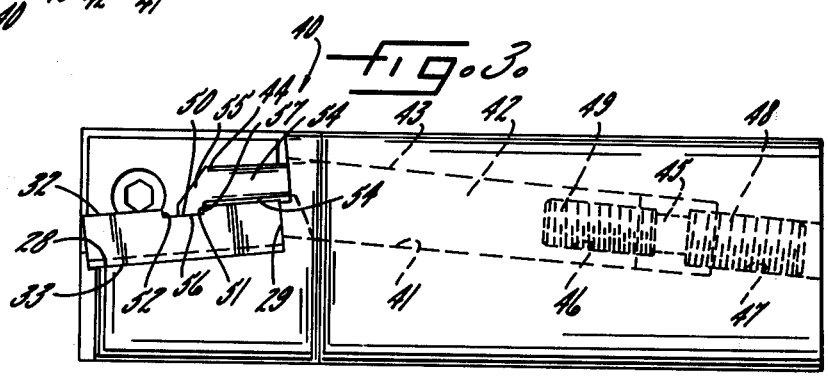
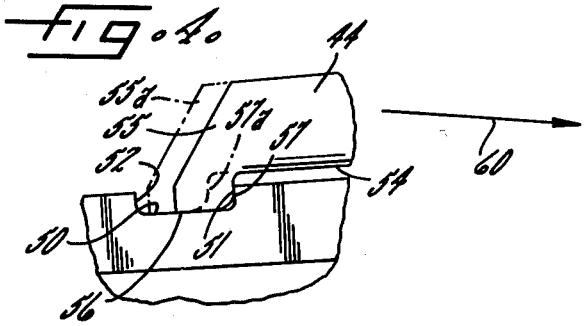

BLOCK TYPE CUTTING TOOL WITH POSITIVE CLAMP FOR INSERT BLADES

The present invention relates to cutting tools, and more particularly to block type cutting tools with clamped on insert blades of the throw away type.

This invention represents an improvement in the block type cutting tools shown in U.S. Pat. No. 3,060,771 to H. L. Johnson and my prior U.S. Pat. No. 3,295,187. U.S. Pat. No. 3,504,413 to R. J. Siewert et al. shows one form of insert blade usable in such tool blocks.

The tool blocks and modifications thereof shown in the aforementioned patents provide a toolholding member including a pocket, the pocket having a supporting and a locating surface, and a clamping means movable into the tool block and having a portion engaging an insert in the pocket which, when drawn into the tool block, wedges the insert into the pocket. While these tool blocks have proven very successful in practice, in some instances sole reliance on wedging force for holding the insert in place has proven inadequate.

For example, when using a double edged cutter such as shown in my previous patent, after completing a bore, the tool is withdrawn from the bore with spindle rotation stopped. The cutter blades are very close to the surface of the bore, and any chips remaining in the bore may interfere with the blades upon removal. An improperly clamped blade may be dislodged from its pocket under these conditions, possibly damaging the newly bored surface. This problem is further aggravated because of the lack of any positive stop in the clamping mechanism, allowing an over-enthusiastic operator to generate excessive forces in an attempt to properly clamp a blade. It is not unknown for the clamping mechanism when overtightened to produce forces sufficient to distort the clamp or the block which, in turn, can cause an inferior cut.

Also among the prior art is U.S. Pat. No. 3,132,542 to Horvath showing a cutter with removable tip wherein the cutter includes a rotatable camming mechanism for forcing the tip against a supporting surface, the camming mechanism including a flange engaging a groove in the insert for providing additional locking support against movement of the tip, particularly against forces tending to pull the tip out of the head. That clamp, however, does not show any means for wedging the blade into the pocket, properly seating the blade before cutting begins, but simply forces the blade against the underlying supporting surface.

In view of the foregoing, it is a general object of the present invention to provide a block type cutting tool with insert cutting blades of the type having a clamping mechanism for wedging the blades into blade receiving pockets, wherein the blades are positively restrained against axial displacement. A further object is to provide such a tool wherein the clamping mechanism produces a perceptible indication when the blade is properly clamped in place.

A detailed object of the present invention is to provide a block type cutting tool with insert type cutter blades including a clamping arrangement wherein the blades are first wedged into the blade receiving pockets for properly seating same, and are then drawn positively against a locating surface of such pocket for more securely retaining the blades in place. According to one aspect of the invention, it is an object to provide such a tool including means for radially adjusting the blade position, the clamping arrangement cooperating with the radial adjustment means to prevent cocking of the blade while the radial adjustment is carried out.

Other objects and advantages will become apparent from the following detailed description when taken in conjunction with the drawings in which:

FIG. 1 is a perspective view of a block type cutting tool illustrating the present invention;

FIG. 2 is an enlarged fragmentary plan view of the tool of FIG. 1;

FIG. 3 is an enlarged end elevational view of the tool of FIG. 1 but showing a negative rake angle insert; and FIG. 4 is an enlarged fragmentary view showing the engagement between the clamping mechanism and the insert in the tool blocks of FIGS. 1–3.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Turning now to the drawings, FIG. 1 shows a block type cutting tool generally indicated at 20 for use with insert type cutter blades, and illustrating the interrelationship between the clamping mechanism and cutter blade according to the present invention. The tool block itself is very similar to that shown in my prior U.S. Pat. No. 3,295,187, and is also somewhat similar to that shown in Johnson U.S. Pat. No. 3,060,771, being adapted for use in a boring bar (not shown) driven by a machine tool spindle. It comprises a holder in the form of a generally rectangular block 21 having a tapered transverse bore 22 through its medial portion perpendicular to the plane of the block and adapted to register with a tapered pin (not shown) to lock the tool in the boring bar.

The block 20 carries a pair of diametrically opposed cutting blades 24 which may be throw away inserts of tungsten carbide or the like. As will be described in more detail below, each blade 24 is clamped in the block 21 and disposed so that its outer end portion presents a single cutting edge 25 for boring. As shown in the aforementioned patents, the outer end of the block may be somewhat rounded to achieve suitable clearances with the bore produced by the tool.

Referring in more detail to the insert holding section of the block 20, it is seen that there is provided a blade receiving pocket 26 having a supporting surface 28 which inclines generally downwardly and outwardly toward the edge of the block. An upstanding locating surface 29 is generally perpendicular to the supporting surface 28 and may be stepped as shown in FIG. 3 or generally continuous as shown in my aforementioned patent. A second locating surface 30 is also provided, in the instant case by an adjusting wedge mechanism 31.

The cutter insert itself has a pair of generally parallel surfaces 32, 33 joined by flat sides 34–37. The insert may be generally square in plan view, or as shown in FIGS. 1 and 2, slightly rhomboid, with the acute angles of the rhombus forming the cutting edges. In the latter case, the insert may be indexed to provide four cutting edges, two on each side of the insert.

The insert illustrated in FIGS. 1 and 2 has cutting faces of the type disclosed in the aforementioned Siewert patent, providing a positive rake angle cutting geometry in a negative rake tool block. FIG. 3, however, illustrates another form of cutting insert, wherein the upper and lower faces 32, 33 are generally flat, the arrangement providing a negative rake angle cutting geometry.

For locking the cutting insert in the tool block, clamp means 40 are provided, operable between a relaxed position in which the blade is released for changing or indexing, and a clamped position in which the blade is seated in the pocket. A drilled hole 41 is formed in the tool block, having an opening into the pocket, and is adapted to receive a clamp member 42 having a shank 43 slidable in the bore 41. The clamp 42 includes an extended portion 44 projecting from the drilled hole into the pocket. The hole 41 is inclined with respect to the broad face of the block, while lying generally parallel to the end of the block, so that drawing the shank 42 into the hole 41 serves to move the extended portion 44 inwardly and downwardly into the pocket.

To move the clamp member 42 into the drilled hole 41, a clamp screw 45 is threadedly engaged in a tapped hole 46 in the end of the clamp member 42, and in a threaded section 47 of the drilled hole 41. The outer end 48 of the clamp screw 45 has a left-hand thread as has the section 47, while the inner end 49 has a right-hand thread engaging the threads 46 in the clamp member 42. Rotation of the screw 45, as by an Allan wrench in a socket in the head of the screw, causes the clamp 42 to be adjusted axially of the hole 41 in the block 21. The angular disposition of the axis of movement of the clamp 40 inwardly and downwardly into the pocket 24 causes the end 44 of the clamp to engage the blade in the pocket.

In accordance with an important aspect of the present invention, the extended portion 44 of the clamp member 42, and the upper surface 32 of the blade 24 are formed to provide mutually coacting surfaces for initially wedging the blade into the pocket, and then positively drawing the blade against one of the locating surfaces. To that end, the blade 24 is formed with a central groove 50 running generally parallel to the edges 35, 37 and approximately intermediate thereof, the groove having an upstanding lip 51 mating the clamp in the illustrated position, and a second upstanding lip 52 for mating the clamp when the insert is reversed.

The extended portion 44 of the clamp 40 is formed with an undercut portion 54 overlying but spaced from the insert, and a tip 55 engagable with the groove 50. For reasons which will soon become apparent, the portion of the tip 55 engaging the groove 50 is narrower than the groove itself. The tip 55 has a lower surface 56 generally parallel to the supporting surface 28 of the tool block, and therefore generally parallel to the upper surface 32 of the insert. The lower surface 56 terminates in an inner upstanding shoulder 57, generally perpendicular thereto. The hole 41 is inclined with respect to the pocket 26 in such a way that withdrawal of the clamp member 42 into the hole 41 moves the tip 55 both inwardly and downwardly into the pocket such that the lower flattened portion 56 initially engages the groove 50 but not the lip 51. Thus the first phase of clamp operation serves to wedge the insert 24 into the insert receiving pocket 26. As the clamp is further tightened, the upstanding shoulder 57 engages the lip 51 of the insert, serving to positively hold the insert 57 against the locating surface 29. The groove 50 is formed generally parallel to the edges 35, 37 of the blade, and the clamp 40 moves generally perpendicularly with respect to the groove (as viewed in FIG. 2) upon adjustment, to securely engage the lip across the entire width of the upstanding shoulder 57 of the clamp. Thus, the insert is not only firmly wedged into the pocket, but is positively restrained from being dislodged therefrom, such as when the tool is removed from a completed bore. Accordingly, even if the bore becomes packed with chips, the arrangement is better able to resist any dislodging forces imposed on the insert, circumventing the shortcomings of prior tool blocks of this kind.

A further important advantage flows from the illustrated construction. More specifically, in tool blocks using the wedging type clamping mechanism illustrated in the aforementioned patents, in some cases operators have been over-enthusiastic in clamping the insert into the pocket in order to prevent dislodging of same upon withdrawal of the tool. Because those mechanisms provide no positive indication that the cutter is, in fact, properly locked in place, continual tightening of the clamp, even beyond its intended locked position, simply deflects certain of the elements, allowing greater and greater wedging forces to be produced. By virtue of the illustrated structure, however, the clamping mechanism has a built-in positive stop in the form of a perceptible increase in force required to operate the locking mechanism beyond the locked position. In other words, the force necessary to lock the clamping mechanism gradually increases as the blade is wedged into the pocket, but when the shoulder 57 engages the lip 51, the amount of force required to further tighten the clamp quite perceptibly increases, indicating to the operator that the blade is, indeed, locked firmly in position.

Referring now to FIG. 4, there is shown an enlarged view of the groove 50 of the insert 24 engaged by the tip 55 of the clamp 40. The arrow 60, indicates the general direction of movement of the clamp 40 upon tightening thereof. The groove 50 is significantly wider than the lower surface 56 of the clamp tip 55, so that the initial engagement between the clamp and the groove (as shown by tip 55a in dashed lines) occurs with the upstanding shoulder 57a spaced from the lip 51. As the clamp is further tightened, moving in the direction of the arrow 60, the flattened portion 56 of the tip 55 will exert a wedging force on the lower face of the groove 50 to seat the insert 24 in the pocket. Further movement of the clamp causes the face 56 of the clamp to slide in the groove 50 toward the lip 51, slightly deflecting the shank of the clamp and firmly wedging the blade in place. Ultimately, the upstanding shoulder 57 engages the lip 51 (as shown in full lines) forcing the blade firmly against the locating surface 29, and indicating, by way of a perceptible increase in the amount of force required for further adjustment, that the clamp is properly locked. Preferably, the lips 51 and 52 are formed with sharp corners 61, 62 where they meet the upper surface 32 of the blade, so that the lip 51 or 52 positively engages the upstanding shoulder 57. To assure that this contact is the initial engagement between these elements, the corner joining the lower face 56 and the upstanding shoulder 57 of the tip 55 is preferably radiused.

The illustrated tool block 20 is advantageously provided with a radial adjusting mechanism 31 for precisely setting the radial location of the cutting tip 25. Such adjusting mechanism is adequately described in my aforementioned patent and includes an adjusting wedge 70 carrying a locating surface 30 for engaging the edge 36 of the insert, and precisely locating such edge. The wedge member 70 includes a guide plunger 71 slidably mounted in a bore 72 in the block 21. Adjustment of the wedge is accomplished by means of a set screw 74 threadedly engaged in the wedge 70 generally parallel to the plunger. The screw 74 bears against an upstanding surface 75 of the block, and may be turned as by means of an Allan head wrench to adjust the radial position of the wedge 70 in the pocket.

The clamping mechanism according to the present invention co-acts with the radial adjusting mechanism 31 to prevent cocking of the blade 24 as radial adjustment is carried out. More specifically, the radial position of the blade is adjusted with the insert in the fully clamped position so that the blade is positively guided for radial movement by a pair of tracks. One of such tracks is provided by the locating surface 29 engaging the edge 37 of the insert while the second of the tracks is provided by the inner upstanding shoulder 57 of the clamp engaging the lip 51 of the groove. As a result, radial adjustment may be carried out without concern for cocking of the insert during adjustment.

To allow the cutting blade to be indexed to bring the respective cutting edges into play, the groove 50 is formed centrally of the insert so that the insert may be rotated 180° for use of the opposite cutting tip. In addition, a second groove 80 may be provided on the opposite face 33 of the insert, such groove running generally parallel to the edges 34, 36 so as to allow two cutting edges on the opposite side of the insert to be used. Thus, the tool may be provided with four cutting faces, each adapted to be positively locked into machining position.

I claim as my invention:

1. A block type cutting tool with insert type cutter blade comprising in combination, a holder block having a blade receiving pocket with an inclined supporting surface and an upstanding locating surface, an insert type cutter blade having generally parallel upper and lower surfaces and flat sides, a groove in at least one of the parallel surfaces of said blade having a planar floor and upstanding lips, the blade being mounted in the pocket so that one of said parallel surfaces rests on said supporting surface, one of said sides abuts said locating surface and said groove faces upwardly and runs generally parallel to said locating surface, clamp means having a lower surface narrower than said groove and an upstanding shoulder generally parallel to a lip of said groove, said clamp means including adjusting means for drawing the lower surface thereof into engagement with the floor of said groove to progressively wedge the blade into the pocket ultimately bringing said upstanding shoulder into engagement with the lip of said groove, thereby to positively clamp said blade to said locating surface and to provide a perceptible clamping stop.

2. The block type cutting tool as set forth in claim 1 wherein the clamp means includes a shank portion slidable within a hole in said block and having an extension projecting through said locating surface into said pocket, said lower surface and shoulder being formed on said extension, said clamp means being slightly deflectable as said blade is wedged into said pocket to allow said upstanding shoulder to be drawn into contact with said lip.

3. The block type cutting tool as set forth in claim 1 further including radial adjustment means engaging another of said flat sides of said blade for adjusting the position of said blade along said locating surface, said shoulder engaging the lip of said groove when locked with the blade in any radially adjusted position to provide said positive clamping.

4. The block type cutting tool as set forth in claim 1 wherein the clamp means includes a shank portion fitted in a hole in said block opening into said pocket, an extension on said shank projecting into said pocket and terminating in said lower surface, a clamp screw threaded in said hole and engaging said clamp so that rotation of the screw shifts said lower surface in a direction toward both said supporting surface and said locating surface.

5. The block type cutting tool as set forth in claim 1 further including radial adjustment means comprising an adjusting wedge disposed in a recess adjacent said pocket for sliding movement toward and away from said pocket, said wedge engaging one of the flat sides of said insert, a guide plunger fixed to the wedge, means defining a bore in the block for receiving the guide plunger and guiding the wedge toward and away from said pocket, and an adjusting screw in the wedge substantially parallel to the guide plunger and adapted to bear against a wall of the recess to adjust the blade radially of the block, said shoulder engaging the lip of said blade for assisting said guide plunger in guiding the blade when said wedge is adjusted toward said pocket and to positively clamp said blade in any radially adjusted position.

6. A block type cutting tool with insert type cutter blade comprising in combination, a holder block having a blade receiving pocket with an inclined supporting surface and an upstanding locating surface, an insert type cutter blade having generally parallel upper and lower surfaces and flat sides, said upper and lower surfaces being slightly parallelogram-shaped, a groove in at least one of the parallel surfaces of said blade located centrally thereof and being generally parallel to two of said sides, said groove having a generally planar floor and an upstanding lip, the blade being mounted in the pocket so that one of said parallel surfaces rests on said supporting surface, one of said sides abuts said locating surface and said groove faces upwardly and runs generally parallel to said locating surface, clamp means having an extension projecting through said upstanding locating surface and into said pocket, said clamp means including adjusting means for moving said extension in a direction toward both the supporting surface and the locating surface, said extension including a lower surface narrower than said groove and an upstanding shoulder rising from said lower surface so that operation of said adjusting means serves to engage the lower surface of the clamp means with the floor of said groove to progressively wedge the blade into the pocket ultimately bringing said shoulder into engagement with the lip of said groove to positively clamp the blade against said locating surface.

7. A block type cutting tool with insert type cutter blades comprising in combination, a holder block having a pair of diametrically opposed blade receiving pockets in opposite sides thereof, each said pocket having an inclined supporting surface and an upstanding locating surface, a pair of insert type cutter blades each having generally parallel upper and lower surfaces and flat sides, said upper and lower surfaces being slightly parallelogram-shaped, a groove in at least one of the parallel surfaces of each said blade located centrally thereof, and being generally parallel to two of said sides, each groove having a generally planar floor and an upstanding lip, each blade being mounted in a corresponding one of said pockets such that one of said parallel surfaces rests on said supporting surface, one of said sides abuts said locating surface and said groove faces upwardly and runs generally parallel to said locating surface, clamp means for each of said pockets, each said clamp means having an extension projecting through said upstanding locating surface and into the corresponding pocket, each said clamp means including adjusting means for moving said extension in a direction toward both the supporting surface and the locating surface, each said extension including a lower surface narrower than said groove for engaging the floor of same and an upstanding shoulder rising from said lower surface for mating the lip of said groove when said clamp is locked whereby operation of the adjusting means draws the lower surface of said clamp means into engagement with the floor of said groove to progressively clamp the blade in said pocket ultimately bringing said shoulder into engagement with the lip of said groove to positively clamp the blade against said locating surface.

8. A block type cutting tool with insert type cutter blade comprising in combination, a holder block having a blade receiving pocket with an inclined supporting surface and an upstanding locating surface, an insert type cutter blade having generally planar upper and lower surfaces and flat sides, the blade being mounted in the pocket so that one of said parallel surfaces rests on said supporting surface and one of said sides abuts said locating surface, said block having adjustment means for positioning the blade radially along said locating surface, clamp means having an extension projecting through said locating surface into said pocket, the extension of said clamp means having a lower surface for engaging the blade and a shoulder rising therefrom, locking means for moving said extension in a direction toward both the supporting surface and the locating surface, said blade having a groove in the upper surface thereof, said groove having a floor for engaging the lower surface of said extension to wedge the blade in the pocket and an upstanding lip for engaging said shoulder for positively clamping the blade against said locating surface, said groove being parallel to said locating surface with the blade in the pocket to allow engagement between said extension and said groove in any radially adjusted position of said blade.

* * * * *